United States Patent
Jian et al.

(10) Patent No.: US 11,951,976 B2
(45) Date of Patent: Apr. 9, 2024

(54) METHOD FOR AUTOMATED PARKING, DEVICE, AND STORAGE MEDIUM

(71) Applicant: BEIJING BAIDU NETCOM SCIENCE TECHNOLOGY CO., LTD., Beijing (CN)

(72) Inventors: Huiling Jian, Beijing (CN); Xinjing Li, Beijing (CN); Jia Song, Beijing (CN); Pengfei Wei, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/889,867

(22) Filed: Aug. 17, 2022

(65) Prior Publication Data
US 2022/0388501 A1 Dec. 8, 2022

(30) Foreign Application Priority Data
Aug. 20, 2021 (CN) .......................... 202110964609.0

(51) Int. Cl.
*B60W 30/06* (2006.01)
*G06T 7/579* (2017.01)

(52) U.S. Cl.
CPC ............. *B60W 30/06* (2013.01); *G06T 7/579* (2017.01); *B60W 2556/10* (2020.02); *G06T 2207/30264* (2013.01)

(58) Field of Classification Search
CPC .. B60W 30/06; B60W 2556/10; B60W 40/00; G06T 7/579; G06T 2207/30264; B62D 15/0285
See application file for complete search history.

(56) References Cited

U.S. PATENT DOCUMENTS

| 2015/0061895 A1* | 3/2015 | Ricci | ...................... B60K 28/00 340/902 |
| 2019/0347809 A1* | 11/2019 | Sato | ...................... G06V 20/52 |

(Continued)

FOREIGN PATENT DOCUMENTS

| CN | 109466546 | 3/2019 |
| CN | 110329245 | 10/2019 |

(Continued)

OTHER PUBLICATIONS

Chinese Office Action issued in corresponding Chinese Patent Application No. 202110964609.0, dated Mar. 14, 2022.

*Primary Examiner* — Daryl C Pope
(74) *Attorney, Agent, or Firm* — Pillsbury Winthrop Shaw Pittman, LLP (57) ABSTRACT

A method for automated parking, a device, and a storage medium, which relate to a field of automated parking. The method for automated parking includes: determining, based on a historical location of a vehicle over a first time period, a frequented region associated with one or more candidate parking routes for the vehicle; acquiring the one or more candidate parking routes for the vehicle based on one or more historical parking routes of the vehicle in the frequented region, where the one or more historical parking routes include a driving-in route and/or a driving-out route; and providing the vehicle with the acquired one or more candidate parking routes in response to determining that the vehicle is in the frequented region, for the vehicle to drive in or drive out.

20 Claims, 6 Drawing Sheets

(56) References Cited

U.S. PATENT DOCUMENTS

2020/0151611 A1* 5/2020 McGavran ............. G06N 20/00
2020/0202706 A1* 6/2020 Chaves ................ G05D 1/0289

FOREIGN PATENT DOCUMENTS

| CN | 111923901   | 11/2020 |
| CN | 112172792   | 1/2021  |
| CN | 112622881   | 4/2021  |
| DE | 102019007343 | 8/2020 |

* cited by examiner

METHOD FOR AUTOMATED PARKING, DEVICE, AND STORAGE MEDIUM

This application claims the benefit of priority of Chinese Patent Application No. 202110964609.0 filed on Aug. 20, 2021, the whole disclosure of which is incorporated herein by reference.

TECHNICAL FIELD

The present disclosure relates to a field of automated parking, in particular to a method for automated parking, an electronic device, and a computer storage medium.

BACKGROUND

In autonomous driving technology, automated parking may provide a user with great convenience. Automated parking technology may help the user complete a parking process automatically or semi-automatically without the user's operation. The parking process may include a driving-in process or a driving-out process. The current driving-in or driving-out function relies on a parking route created by the user. In other words, the user needs to drive to a starting point of a parking route to set the starting point, then drive to an end point of the parking route to set the end point, and finally the user needs to wait for the generation of the parking route.

SUMMARY

According to embodiments of the present disclosure, a solution for automated parking is provided.

According to an aspect of the present disclosure, there is provided a method for automated parking. The method includes: determining, based on a historical location of a vehicle over a first time period, a frequented region associated with one or more candidate parking routes for the vehicle; acquiring the one or more candidate parking routes for the vehicle based on one or more historical parking routes of the vehicle in the frequented region, where the one or more historical parking routes include a driving-in route and/or a driving-out route; and providing the vehicle with the acquired one or more candidate parking routes in response to determining that the vehicle is in the frequented region, for the vehicle to drive in or drive out.

According to an aspect of the present disclosure, there is provided an electronic device. The electronic device includes: one or more processors; and a memory communicatively configured to store one or more programs which, when executed by the one or more processors, cause the one or more processors to implement a method described herein.

According to an aspect of the present disclosure, there is provided a non-transitory computer-readable storage medium having computer instructions stored thereon, where the computer instructions allow a computer to implement a method described herein.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The above and other features, advantages and aspects of embodiments of the present disclosure will become more apparent in combination with the drawings and with reference to the following detailed description. In the drawings, the same or similar reference numerals indicate the same or similar elements.

DETAILED DESCRIPTION OF EMBODIMENTS

Embodiments of the present disclosure are described below in more detail with reference to the drawings. Although some embodiments of the present disclosure are shown in the drawings, it will be understood that the present disclosure may be embodied in various forms and should not be construed as limited to embodiments set forth herein, but rather these embodiments are provided for a thorough and complete understanding of the present disclosure. It will be understood that the drawings and embodiments of the present disclosure are merely exemplary, and are not intended to limit the protection scope of the present disclosure.

In the description of embodiments of the present disclosure, the term "including" and similar terms should be understood as open-ended inclusion, that is, "including but not limited to". The term "based on" should be understood as "at least partially based on." The term "an embodiment," or "this embodiment" should be understood as "at least one embodiment." The terms "first," "second," and the like may refer to different or the same objects. The following may also include other explicit and implicit definitions.

As mentioned above, in a process of automated parking of the vehicle (preferably an intelligent driving vehicle), a user needs to drive to a starting point of a parking route to set the starting point, then to an end point of the parking route to set the end point, and finally, the user needs to wait for the generation of the parking route.

Traditionally, there are two solutions for generating an automated parking route. In one solution, the generation of the parking route requires the user to set the starting point of the parking route after driving to the parking route, and simultaneous localization and mapping (SLAM) is performed for the route while the vehicle is traveling from the starting point to the end point of the route. The mapping is completed after the user finishes setting the end point, and the route is stored and learned according to a type of the route and a type of the parking space which are set by the user. As is well known to those skilled in the art, SLAM information is a method for tracking a location of a robot or a vehicle in the world in real time and identifying locations of landmarks (such as buildings, obstacles, road signs and other object features).

In the other solution, a background program performs route training and then stores the route according to the user's automatic mapping information.

However, both the two solutions above require the user to create the route actively, that is, the user needs to actively send the route information to a vehicle computing device or a cloud device. Such technical solutions result in a high threshold for use and poor user experience. In addition, a high computing power of the computing device or system is required for the simultaneous localization and mapping for the route while the vehicle is traveling from the starting point to the end point of the route, so that the hardware costs are increased.

To at least partially address the above and other potential problems, the present disclosure proposes a solution for automated parking. In this solution, a frequented region may be determined based on a location where a vehicle often appears, and route self-learning is performed after the vehicle enters the frequented region. After the route is determined through self-learning and then verified, when the vehicle enters the frequented region again, the verified route is automatically recommended to the vehicle for the vehicle to drive in or drive out. Moreover, it is possible to acquire surrounding environmental information of a garage without relying on or not completely relying on a vehicle camera. In this way, the user may be exempted from manually setting the route, so that the threshold for use may be lowered, the user experience may be improved, and the practicability and utilization rate of the automated parking function may be improved. Moreover, it is possible to reduce the pressure on the computing device and reduce hardware costs.

Hereinafter, embodiments of the present disclosure will be described in detail with reference to the drawings.

Figure 1:
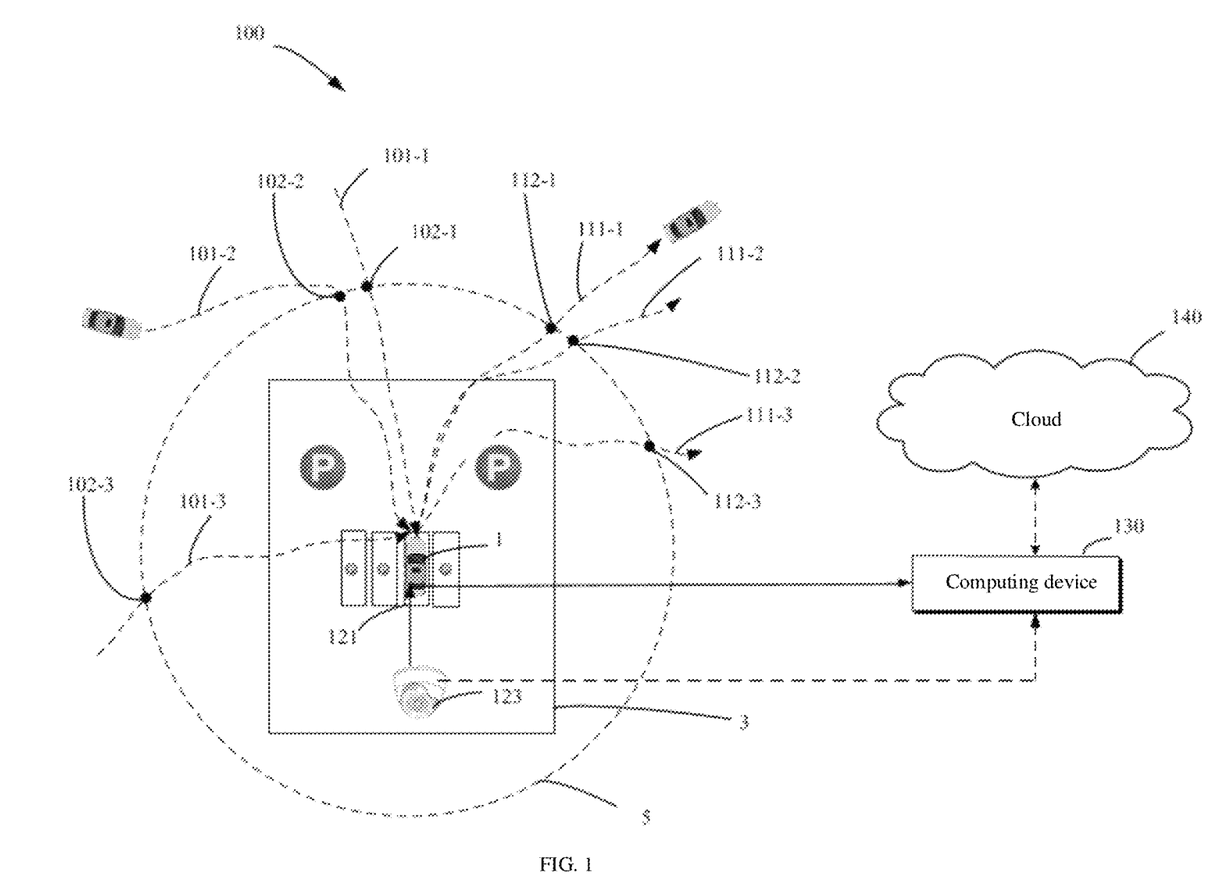
FIG. 1 shows a schematic diagram of an exemplary environment applicable to implementation of a plurality of embodiments of the present disclosure.

FIG. 1 shows a schematic diagram of an exemplary environment applicable to implementation of a plurality of embodiments of the present disclosure. A vehicle 1 and a parking region 3 may be included in the exemplary environment 100. The vehicle 1 may be any motor vehicle or non-motor vehicle, such as a car, a truck, a motorcycle, a bus, an electric vehicle, a police car, a fire truck, or other vehicles with equipment to perform specified operations. The parking region 3 may be a fixed parking lot (such as a parking lot of a shopping mall, a dedicated parking lot, or an above-ground or underground parking lot of a community), a temporary parking lot, or other regions suitable for parking, such as a location where the vehicle often parks, including a location marked with a parking space line or a temporary parking spot without a parking space line.

In embodiments, the parking region 3 may have one or more entrances or exits. Accordingly, the parking region 3 may have one or more parking routes corresponding to the vehicle 1. It will be noted that the parking route may include a driving-in route or a driving-out route. Correspondingly, according to a specific structure of the parking region 3, there may be one or more driving-in routes and driving-out routes, respectively.

In an embodiment, as shown in FIG. 1, the vehicle 1 may be provided with three driving-in routes 101-1, 101-2, and 101-3 (which may also be collectively referred to as driving-in routes 101), and the vehicle 1 may pull in a parking space 121 via any one of the three driving-in routes above. It will be noted that the three routes above are only exemplary, and there may be any other suitable number of driving-in routes, such as only one, two, four, six or more driving-in routes, which is not limited in the present disclosure.

In this embodiment, with continued reference to FIG. 1, the vehicle 1 may be further provided with three driving-out routes 111-1, 111-2, and 111-3 (which may also be collectively referred to as driving-out routes 111). The vehicle 1 may pull out of the parking space 121 via any one of the three driving-out routes above. It will be noted that the above-mentioned three routes are only exemplary, and there may be any other appropriate number of driving-out routes, such as only one, two, four, six or more driving-out routes, which is not limited in the present disclosure. It will also be noted that an embodiment shown in FIG. 1 is only exemplary, and the number of the driving-in routes is not necessarily the same as the number of the driving-out routes.

The above-mentioned driving-in routes 101-1, 101-2, and 101-3, and the above-mentioned driving-out routes 111-1, 111-2, and 111-3 are historical driving-in or driving-out trajectories of the vehicle, and therefore may be referred to as historical parking routes or historical parking trajectories. It will be noted that routes, tracks and paths in the present disclosure are of the same or similar concepts, and may be used interchangeably in the context of the present disclosure.

In embodiments, with continued reference to FIG. 1, in the environment 100, the frequented region 5 may be determined based on a historical location of the vehicle 1 over a first time period. The first time period may be predetermined, for example, the first time period may be set to any appropriate number of days, such as 5 days, 7 days, and 10 days. The historical location may correspond to a location point in the fixed parking lot, temporary parking lot, or other regions suitable for parking in the aforementioned parking region 3, such as a location point of the parking space 121 shown in FIG. 1 or other location points where the vehicle appears within the range of the parking region 3.

Taking that the first time period is of 7 days and the vehicle 1 pull in or pull out of the parking region 3 as an example, the following will introduce how to determine the frequented region 5 with a continued reference with FIG. 1.

In this embodiment, location information of the vehicle 1 at a current location may be recorded after the engine of vehicle 1 is turned on. Specifically, the location information of the vehicle 1 may be determined through the vehicle GPS of the vehicle 1. In embodiments, when the vehicle 1 is in a region such as an underground parking lot, the location information of the vehicle 1 sometimes cannot be acquired effectively, then the location information recorded by the vehicle for the last time may be acquired. It will be noted that the location information acquired by the GPS is only exemplary, and the location information may also be acquired in other ways, for example, by Wi-Fi positioning, base station positioning, or BeiDou Navigation Satellite System positioning.

In an embodiment, when the number of appearance of the vehicle 1 in the parking region 3 within the past 7 days is not less than a first threshold, it may be determined that a range associated with the parking region 3 is the frequented region 5. Specifically, the parking region may be directly determined as the frequented region 5. In other words, the frequented region may be determined based on a frequency of appearance of the vehicle 1 over the first time period of 7 days. The first threshold may be set by the system as desired, or may be set by the user as desired, which is not limited in the present disclosure. For example, the first threshold may be set to 3 times, 4 times, or the like.

In another embodiment, the frequented region 5 may be determined by first determining the location point corresponding to the historical location of the vehicle in the manner described above. As previously described, the location point may correspond to the parking space 121. In this embodiment, a predetermined region may be first determined based on the location point corresponding to the parking space 121 and a first predetermined distance. The first predetermined distance may be set by the system or the user as desired, such as 200 meters, 1000 meters, or any other appropriate distance, which is not limited in the present disclosure. It will be noted that a circular predetermined region may be determined in this way, but the predetermined region may also be in other shapes, such as a rectangle, a polygon, or other irregular shape.

In such embodiments, after the predetermined region is determined based on the location point and the first predetermined distance, the predetermined region may be determined as the frequented region 5 in response to the number of appearance of the vehicle 1 in the predetermined region over the first time period is not less than the first threshold. In this way, the frequented region 5 may be accurately determined.

In another embodiment, in a case where there are a plurality of location points (for example, there may be a plurality of parking spaces 121 available in the same parking region 3, or a plurality of valid location points are acquired by GPS) corresponding to the historical location of the vehicle 1 in the parking region 3, there may be a plurality of predetermined regions determined according to the above embodiment. According to different first predetermined distances, an overlapping region may exist among the respective predetermined regions. In this case, after the plurality of predetermined regions are determined based on the plurality of location points and the first predetermined distances, when it is determined that an overlap exist among at least two predetermined regions in the plurality of predetermined regions, the at least two predetermined regions may be determined as the frequented region 5. Through such an arrangement, a range of the frequented region 5 may be expanded to cover all possible parking spaces 121, so as to more accurately and effectively prompt the vehicle 1 to drive in or drive out.

It will be noted that, when a new frequented region 5 is determined, the determination of an initial location point usually requires that the initial location point is located outside other already determined frequented regions 5. The reason is that if this initially determined location point is located in a previously determined frequented region 5, a step of "acquiring one or more candidate parking routes based on one or more historical parking routes" after the frequented region 5 is determined will be triggered. This will be explained in more detail below.

It will also be noted that, although in an embodiment shown in FIG. 1, an area of the frequented region 5 is larger than an area of the parking region 3, this is only an example, and the area of the frequented region 5 may also be equal to or smaller than the area of the parking region 3, which is not limited in the present disclosure.

Continuing to refer to FIG. 1, the above-mentioned embodiments of determining the frequented region 5 may be implemented by a computing device 130 or a corresponding system. In embodiments, the computing device 130 may include a desktop computer, a tablet computer, a personal digital assistant (PDA), a server, a mainframe, etc., or any other processor-enabled device capable of performing wired or wireless data communications. The computing device 130 may be any computing device provided outside the vehicle 1, or any computing device preferably provided on or in the vehicle 1, that is, the computing device 130 may be a vehicle computing device. In embodiments, the computing device 130 may also be connected to the Internet in a wired or wireless manner, so as to upload the above-mentioned data related to the acquisition of the frequented region 5 to a cloud 140.

It will be noted that the cloud 140 is only a preferred solution provided, but is not required. The reason is that when the network is in a good state, the vehicle may provide a support to the cloud 140 for computing and learning, and the computing and learning may be mainly performed by the cloud 140. When the network state is poor or the network is disconnected, the computing and learning may be performed by the computing device 130. That is, according to different network environments, the system under the environment 100 may effectively switch between local computing and cloud computing, so as to meet usage requirements in different scenarios.

It will be noted that operations and steps to be performed in the environment 100 may be processed by the computing device 130 and the cloud 140 in a similar manner. That is, the above-mentioned manner in which computing and learning are performed by the computing device 130 and the cloud 140 may be applied to all steps described below, and this will not be repeated hereinafter.

In embodiments, with continued reference to FIG. 1, after the frequented region 5 is determined, one or more candidate parking routes may be acquired for the vehicle 1 based on one or more historical parking routes of the vehicle 1 in the frequented region 5. As previously described, the one or more historical parking routes include one or more of driving-in routes (e.g., the driving-in routes 101-1, 101-2, and 101-3) and driving-out routes (e.g., the driving-out routes 111-1, 111-2, and 111-3).

In an embodiment, the one or more historical parking routes may be determined in a "silent learning" manner. Similarly, the one or more candidate parking routes for the vehicle may also be acquired based on the one or more historical parking routes of the vehicle in the frequented region in the "silent learning" manner. In the computer field, a silent mode generally refers to a mode in which a computer program performs automatic processing without informing the user when a specific situation occurs, so that normal operations by the user is not affected.

In an embodiment, when acquiring the one or more candidate parking routes for the vehicle 1, the one or more historical parking routes (e.g., the driving-in routes 101-1, 101-2, and 101-3, or the driving-out routes 111-1, 111-2, and 111-3) may be determined in response to the number of appearance of the vehicle 1 within the frequented region 5 being not less than a second threshold. In the above operation, determining the one or more historical parking routes (e.g., the driving-in routes 101-1, 101-2, and 101-3, or the driving-out routes 111-1, 111-2, and 111-3) may include determining a specific number of the one or more historical parking routes. The second threshold may be set by the system or by the user as desired. For example, the second threshold may be set to 5 times, 7 times preferably, 8 times, 10 times, or any other appropriate number. Based on the number of appearance of the vehicle 1 in the frequented region 5, it is possible to involve all possible driving-in or driving-out routes as much as possible, so that the above-mentioned silent learning process may cover all possible routes.

It will be noted that, in the above embodiment, it is not necessary to set a predetermined time period for the determination of the one or more historical parking routes (e.g., the driving-in routes 101-1, 101-2, and 101-3, or the driving-out routes 111-1, 111-2, and 111-3). In other words, after the frequented region 5 is determined to be a familiar road region, the number of appearance of the vehicle 1 in the frequented region 5 may be counted over a time period with an arbitrary length, so as to expect to learn as many routes as possible. It will be understood that those skilled in the art may also set the length of the predetermined time period as desired, such as 20 days, 30 days, or any other appropriate number of days.

In addition, it will be noted that, for different driving-in and driving-out situations, in a same frequented region 5, the learning with a number of times not less than the second threshold (e.g., 7 times) may be performed in the two directions of driving-in and driving-out respectively, so as to record all the historical parking routes of the user in the current frequented region 5 (e.g., the driving-in routes 101-1, 101-2, and 101-3, or the driving-out routes 111-1, 111-2, and 111-3). The flow of acquiring the driving-in routes and the driving-out routes will be described in detail below with reference to FIG. 3 and FIG. 4.

In an embodiment, with continued reference to FIG. 1, the exemplary environment 100 may further include a camera 123 for acquiring surrounding environmental information of the frequented region 5 or the parking region 3. In an embodiment, the camera 123 may be a vehicle camera of the vehicle 1, such as a front-view camera, a surround-view camera, etc., and there may be one or more cameras. In such embodiment, the environmental information, such as the SLAM information, of the frequented region 5 or the parking region 3 may be acquired by the camera 123 during the parking or traveling process of the vehicle 1 in the parking region 3. For example, in the process of determining the frequented region 5, the camera 123 may first acquire the environmental information of the parking region 3, and then the environmental information acquired during the determination of the frequented region 5 is determined as reference environment information.

As such, when the frequented region 5 is determined and the vehicle 1 enters the frequented region 5 again, the camera 123 may continue acquiring environmental information, such as the SLAM information, corresponding to a current route that has been successfully learned. Then, the environmental information of the current route that has been successfully learned may be compared with the reference environment information, so as to determine the one or more historical parking routes (e.g., one or more of the driving-in routes 101-1, 101-2, and 101-3, or the driving-out routes 111-1, 111-2, and 111-3) within the frequented region 5 based on a result of the comparison.

In an embodiment, the result of the comparison is based on a matching degree. In other words, when the result of the comparison of the environmental information is not less than a predetermined matching degree, the current route that has been successfully learned may be determined as an available historical parking route. When the matching degree is not large enough, learning for the current route fails, and the current route that has been successfully learned fails to be determined as an available historical parking route. Alternatively, the comparison based on the environmental information may be a process for validating the parking route, and the matching with the environmental information of the previous location information is performed only when the frequented region 5 is triggered. Once successfully matched, a state of the route will be changed to "completed", and the historical parking route may be provided to the vehicle for automated parking in subsequent operations.

In this way, after comparing the environmental information acquired in the above manner with the reference environment information, it may be determined whether the parking space 121 in the current parking region 3 is a temporary parking space or a fixed parking space based on the result of the comparison.

In other embodiments, the camera 123 may also be a camera installed in the parking region 3, and there may be one or more cameras 123. In this way, the camera 123 may acquire the environmental information of the parking region 3 in real time, without relying on the vehicle computing device to perform the calculation in real time. Thus, high demands on the hardware and software capabilities of the computing device 130 may be reduced without compromising performance.

In such embodiment, the environmental information acquired by the camera 123 may be directly transmitted to the computing device 130, or may be transmitted to the computing device 130 by the vehicle. In addition, the environmental information acquired by the camera 123 may also be transmitted to a separate computing device different from the computing device 130, which is not limited in the present disclosure.

It will be noted that the timing at which the camera 123 acquires the environmental information may be set as desired. For example, in a case where the camera 123 is located on the vehicle 1, the environmental information may be acquired when the vehicle 1 is started or when the vehicle 1 is traveling, or in a case where the camera 123 is located in the parking region 3, the environmental information may be acquired at any appropriate time. The present disclosure does not limit this.

In an embodiment, with continued reference to FIG. 1, when the result of the comparison is lower than the predetermined matching degree, a historical parking route of the one or more historical parking routes may be acquired again in response to the vehicle 1 being in the historical parking route of the one or more historical parking routes again. In this embodiment, in a process of learning a certain route of the one or more historical parking routes, the route may fail to be learned successfully through one-time learning due to various reasons, such as vehicle failure, equipment failure, environmental change, obstacle occlusion. Therefore, the result of the initial comparison may be lower than the predetermined matching degree, causing a failure to the route verification. In order to avoid missing an available route, when the vehicle 1 enters the frequented region 5 again, a plurality of times of learning may be performed for the route, and the route which has been learned for the plurality of times may be re-verified, so as to obtain a more accurate parking route result. It will be noted that the matching degree may be set by the computing device 130 or the system according to the actual situation, or may be set by the user. In addition, the present disclosure does not limit the number of times of learning.

In an embodiment, a second time period may be set when the plurality of times of learning are performed. For example, the second time period may be set to 8 days or 10 days. If the route which has been learned for the plurality of times still fail to pass the comparison or verification described above within the second time period, this historical parking route is cleared and thus no longer a candidate for the candidate parking routes. And once the comparison or verification is passed within the second time period, it is determined that the historical parking route is an alternative for the candidate parking routes, so as to perform route recommendation when the frequented region 5 is subsequently triggered again.

In embodiments of the present disclosure, after the historical parking route is successfully learned, the successfully learned route may be compared or verified, and once the comparison or verification is passed, the historical parking route may be determined as a candidate parking route. In the case of a failure of the comparison, a plurality of times of learning may be performed, and the parking route which has been learned for the plurality of times may be verified. It is further determined whether to determine the historical parking route as a candidate parking route based on the result of the comparison. For a historical parking route that fails to be learned or verified, its state may be changed to invalid and no other operations will be performed.

In an embodiment, the at least one candidate parking route may also be invalidated in response to the number of times the provided at least one candidate parking route are not selected exceeding a fourth threshold. The fourth threshold may be set by the user, or by the computing device 130 or system. The fourth threshold may be any appropriate value, such as 5 times, 6 times, or 8 times. Taking 5 times as an example, when a candidate parking route is recommended to the vehicle for 5 times, but is not adopted each time, the computing device 130 or system may determine that the route is unavailable or in error, and thus change its state to invalid and no longer recommend the route to the vehicle when the frequented region 5 is subsequently triggered.

In embodiments, if the frequented region 5 in a current parking direction meets a requirement of the number of times of learning but each of the current routes is in an invalid state, then all route data under the current frequented region 5 may be cleared after a certain time period (such as 7 days), the state of the frequented region 5 may be initialized, and the number of times of silent learning is set to 0. After the initialization, the learning, management, and recommendation for the route may be again supported when the frequented regions 5 is recreated later.

In embodiments, with continued reference to FIG. 1, in response to the acquired historical parking routes of the vehicle 1 including two or more driving-in routes (e.g., the driving-in routes 101-1, 101-2, and 101-3), the two or more driving-in routes that are at least partially identical, or identical parts of two or more driving-in routes may be determined as a single parking route. Correspondingly, in response to the acquired historical parking routes of the vehicle including two or more driving-out routes (e.g., the driving-out routes 111-1, 111-2, and 111-3), two or more driving-out routes that are at least partially identical, or identical parts of two or more driving-out routes may be determined as a single driving-out route. That is, embodiments of the present disclosure may apply different fusion mechanisms to the driving-in routes 101-1, 101-2, and 101-3, and the driving-out routes 111-1, 111-2, and 111-3.

In this embodiment, the driving-in routes 101-1, 101-2, and 101-3 are taken as an example. In FIG. 1, the driving-in routes 101-1 and 101-2 are relatively close to each other. If the computing device 130 or the system determines that the driving-in routes 101-1 and 101-2 have similar characteristics, for example, if there are similar routes with a length of 5 m and above (i.e., the two routes include several identical characteristic points), the driving-in routes 101-1 and 101-2 are merged. In an embodiment, the two driving-in routes 101-1 and 101-2 may be directly fused into a same driving-in route. The reason is that in a case of the same entrance, trajectories of the parking routes may be different due to different widths of driving lanes, however, they are essentially the same parking route. In this way, data redundancy may be reduced and the pressure on computing of the system may be reduced.

In another embodiment, it is possible to fuse the identical parts of the driving-in routes 101-1 and 101-2. The identical parts of the driving-in routes 101-1 and 101-2 are fused into one driving-in route, and original routes may be retained for other inconsistent parts. In this way, the amount of data calculation and the pressure on system may be reduced.

In such embodiment, with continued reference to FIG. 1, the driving-in route 101-3 is far away from the driving-in routes 101-1 and 101-2, so that there is no consistency in characteristics, and the route map fusion is not performed for the parking route 101-3.

In the embodiment shown in FIG. 1, a fusion mechanism for the driving-out routes 111-1, 111-2, and 111-3 is basically similar to the fusion mechanism of the driving-in routes 101-1, 101-2, and 101-3, and will not be described in detail herein.

It will be noted that any other appropriate fusion mechanism may also be adopted according to actual needs, which is not limited in the present disclosure.

Figure 2:
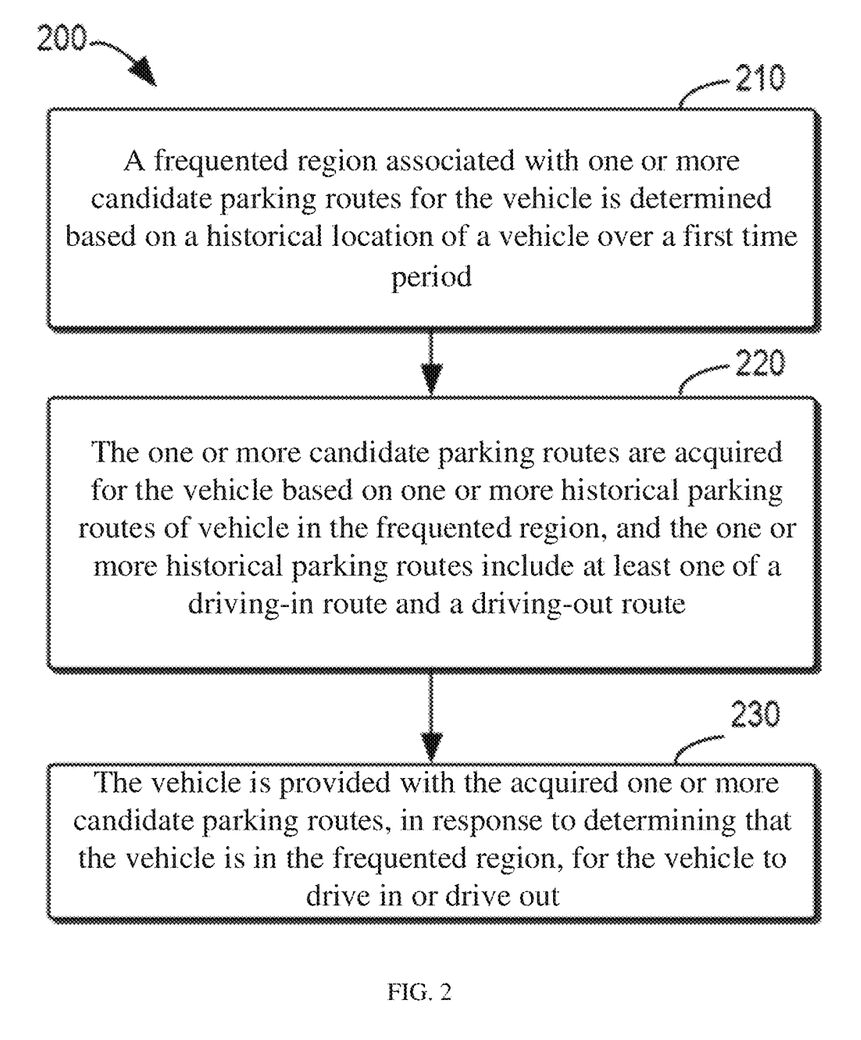
FIG. 2 shows a flowchart of a process of automated parking according to an embodiment of the present disclosure.

FIG. 2 shows a flowchart of a process of automated parking according to an embodiment of the present disclosure. For a clearer understanding of the solution for automated parking provided by embodiments of the present disclosure, embodiments of the present disclosure will be further described with reference to FIG. 1. A process 200 may be implemented by computing device 130 and/or the cloud 140 shown in FIG. 1.

At block 210, a frequented region 5 associated with one or more candidate parking routes for the vehicle 1 is determined based on a historical location of a vehicle over a first time period.

In embodiments, as mentioned above, the historical location may correspond to a location point of a fixed parking lot, a temporary parking lot, or other regions suitable for parking in the aforementioned parking region 3, for example, the location point of the parking space 121 shown in FIG. 1 or other location points where the vehicle appears within the range of the parking region 3.

In embodiments, the frequented region 5 may be a region where the vehicle 1 frequently appears. For example, the frequented region 5 may be a familiar road range or road region where the vehicle 1 appears 3 times or more over 7 days as mentioned above, namely the frequented region 5 circled by the dotted circle in FIG. 1. It will be noted that the frequented region may also be such familiar road range or road region determined by using other parameters. For example, the frequented region may also be delineated by the vehicle 1 according to other preset rules, or may be pre-set after big data analysis is performed on the driving trajectory of the vehicle 1, which is not limited in the present disclosure.

In embodiments, a location point corresponding to the historical location of the vehicle 1 may be determined; a predetermined region is determined based on the location point and a first predetermined distance; and the predetermined region is determined as the frequented region 5 in response to the number of appearance of the vehicle in the predetermined region over the first time period being not less than a first threshold.

In such embodiment, the historical location corresponds to, for example, the location of the parking space 121 shown in FIG. 1. The first predetermined distance may be set by the user or by the system as desired. According to the foregoing, the first threshold is related to the number of appearance of the vehicle 1 in the parking region 3, such as 3 times or more times over 7 days, such that a familiar road range as described above may be determined.

In embodiments, a plurality of location points corresponding to the historical location of the vehicle may be determined; a plurality of predetermined regions are determined based on the plurality of location points and the first predetermined distance; and at least two predetermined regions are determined to be the frequented region in response to determining that an overlap exist among the at least two predetermined regions of the plurality of predetermined regions.

In such embodiment, as shown in FIG. 1, the location point may correspond to the location point of the parking space 121. As such, when an overlap exists among a plurality of predetermined regions, the plurality of predetermined regions may be determined as the frequented region according to a preset rule.

At block 220, the one or more candidate parking routes are acquired for the vehicle 1 based on one or more historical parking routes of vehicle 1 in the frequented region 5, where the one or more historical parking routes include a driving-in route and/or a driving-out route.

In such embodiment, the historical parking routes may be, for example, one or more of the driving-in routes 101-1, 101-2, and 101-3, and the driving-out routes 111-1, 111-2, and 111-3 as shown in FIG. 1. The candidate parking routes may include all routes successfully passing a matching or verification in the above-mentioned driving-in routes 101-1, 101-2, 101-3, or the driving-out routes 111-1, 111-2, 111-3.

In an embodiment, as described above, in the process of acquiring the candidate parking routes, the historical parking routes may be acquired through the above-mentioned "silent learning" mode. As is well known in the art, in the computer field, the silent mode generally refers to a mode in which a computer program performs automatic processing without informing the user when a specific situation occurs, so that the normal operations by the user may not be affected. In this way, all frequently used parking routes may be automatically recorded without the manual operation by the user, so as to provide the parking routes to the vehicle 1 when a trigger condition is met, thereby assisting the automated parking of the vehicle.

It will be understood that the above-mentioned the familiar road range or road region may also be determined through the silent mode, and manual operation by the user is not required for setting, so as to improve the user experience.

In embodiments, one or more historical parking routes may be determined in response to the number of appearance of the vehicle 1 in the frequented region 5 being not less than a second threshold; and the one or more candidate parking routes for the vehicle 1 may be acquired based on the one or more historical parking routes.

In embodiments, the second threshold may be set by the system or by the user as desired. For example, as mentioned above, the second threshold may be set to 5 times, 7 times preferably, 8 times, 10 times or any other appropriate number. Based on the number of appearance of the vehicle 1 in the frequented region 5, it is possible to involve all possible driving-in or driving-out routes as much as possible, so that the above-mentioned silent learning process may cover all possible routes.

At block 230, the vehicle is provided with the acquired one or more candidate parking routes in response to determining that the vehicle 1 is in the frequented region 5, for the vehicle to drive in or drive out.

In embodiments, providing the vehicle 1 with the one or more candidate parking routes may be performed in any appropriate manner, such as voice, text, video, image, and the like. In embodiments, providing the vehicle with the candidate parking routes may further includes sending the route to a vehicle terminal or to other terminal devices, such as a mobile phone of the user of the vehicle.

In embodiments, the at least one candidate parking route may also be invalidated in response to the number of times where the provided one or more candidate parking routes are not selected exceeding a fourth threshold.

In embodiments, the fourth threshold may be any appropriate value, such as 5 times, 6 times, 8 times, and the like. Taking 5 times as an example, when a candidate parking route is recommended to the vehicle for 5 times, but is not adopted each time, the computing device 130 or system may determine that the route is unavailable or in error, and thus change its state to invalid and no longer recommend the route to the vehicle when the frequented region 5 is subsequently triggered. In this way, a mode for invalidating a candidate parking route is provided.

Figure 3:
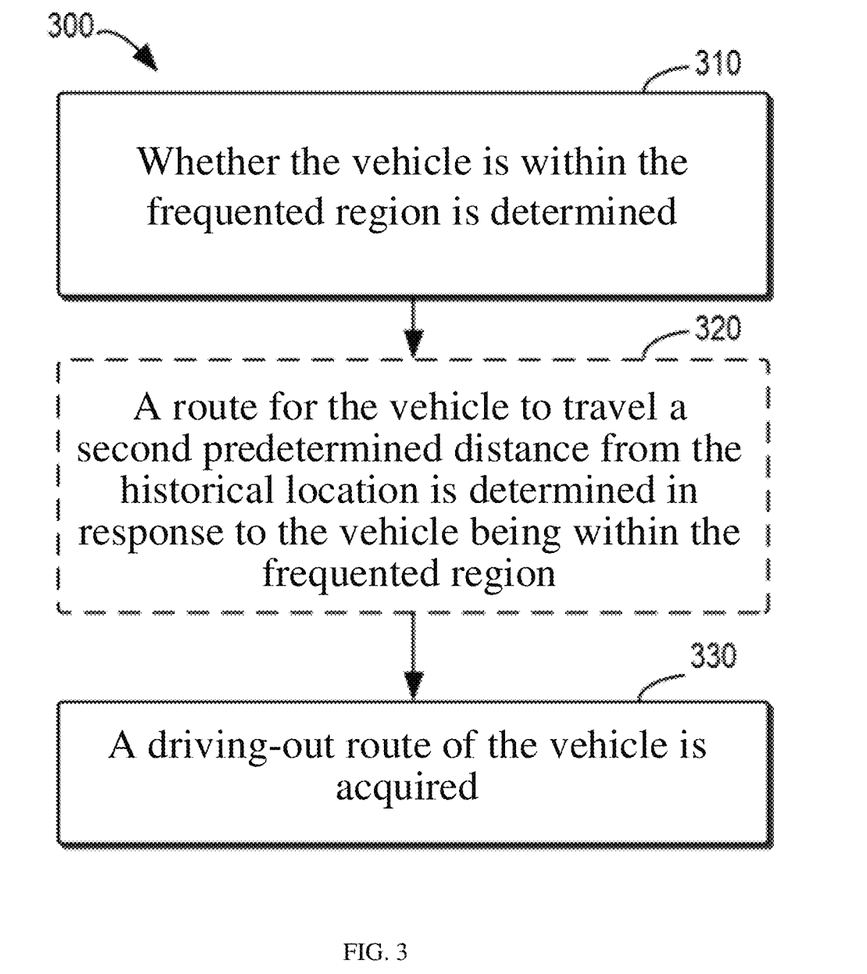
FIG. 3 shows a flowchart of acquiring a driving-out route used for automated parking according to an embodiment of the present disclosure.

FIG. 3 shows a flowchart of acquiring a driving-out route used for automated parking according to an embodiment of the present disclosure. A process 300 may be implemented by the computing device 130 and/or the cloud 140 shown in FIG. 1. For a clearer understanding of the solution for automated parking provided by embodiments of the present disclosure, embodiments of the present disclosure will be further described with reference to FIG. 1. In the example shown in FIG. 3, the process 300 may include a block 310, an optional block 320, and a block 330.

As shown in FIG. 3, at block 310, it may be determined whether the vehicle 1 is within the frequented region 5. Specifically, in an embodiment, when the vehicle 1 located in the parking space 121 is started, it may be determined whether the vehicle 1 is within the frequented region 5. As shown in FIG. 1, in this embodiment, the vehicle 1 is located in the parking space 121, and thus when the vehicle 1 is started, the frequented region 5 is triggered. That is, the vehicle 1 starts the silent learning for the driving-out route.

Taking the route 111-1 as an example, the vehicle 1 is located in the parking space 121 when started, the silent learning for the parking route is triggered, and the silent learning and recording for the route may be performed by the computing device 130 directly, by the cloud 140, or by both. When the vehicle 1 leaves the frequented region 5, that is, when leaving an intersection 112-1 of between route 111-1 and the frequented region 5, the vehicle 1 is no longer within the frequented region 5, so that the silent learning may be terminated, and a driving-out route of the vehicle 1 may be acquired at block 330. Then, as described above, the driving-out route 111-1 may be determined as a historical parking route. Moreover, if the historical parking route passes the comparison or the check of validation, this historical parking route may be provided to the vehicle 1 as a candidate parking route for the automated parking of the vehicle.

Similarly, the driving-out routes 111-2 and 111-3 may be acquired at block 330 by using a starting point at the parking space 121 and intersections 112-2 and 112-3 between the routes and the frequented region 5, and the driving-out routes 111-2 and 111-3 may be determined as candidate parking routes in a similar manner.

At optional block 320, a route for the vehicle 1 to travel a second predetermined distance from the historical location may be determined in response to the vehicle 1 being within the frequented region 5. In the embodiment shown in FIG. 1, the historical location corresponds to the location of the parking space 121, as previously described. It will be understood that the historical location may also be any other location used to determine the frequented region 5, which is not limited in the present disclosure.

Continuing to take the driving-out route 111-1 as an example, in such embodiment, the second predetermined distance may be set by the computing device 130 or the system thereof, or may be set by the user. The second predetermined distance may be any appropriate distance, such as 450 m, 500 m, or 1000 m. In this way, the driving-out route 111-1 may be limited to a length of the second predetermined distance, so as to obtain a more accurate candidate parking route. Subsequently, the driving-out route 111-1 with the length defined as the second predetermined distance may be determined as the driving-out route at block 330.

It will be noted that the above method is only exemplary, and any other method may be used to acquire the driving-out routes 111-1, 111-2, and 111-3, which is not limited in the present disclosure.

Figure 4:
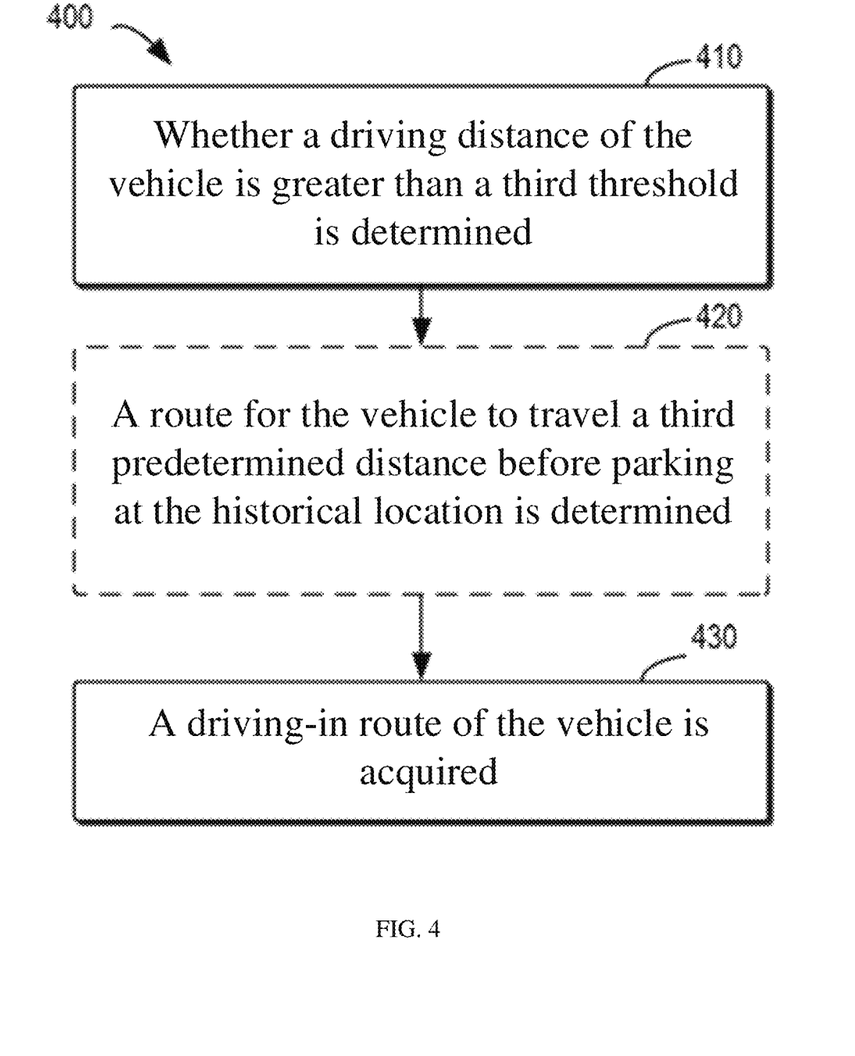
FIG. 4 shows a flowchart of acquiring a driving-in route for automated parking according to an embodiment of the present disclosure.

FIG. 4 shows a flowchart of acquiring a driving-in route for automated parking according to an embodiment of the present disclosure. A process 400 may be implemented by the computing device 130 and/or the cloud 140 shown in FIG. 1. For a clearer understanding of the solution for automated parking provided by embodiments of the present disclosure, embodiments of the present disclosure will be further described with reference to FIG. 1. In the example shown in FIG. 4, the process 400 may include a block 410, an optional block 420, and a block 430.

At block 410, it may be determined whether a driving distance of the vehicle is greater than a third threshold. In such embodiment, the third threshold may be set by the computing device 130 or the system thereof, or may be set by the user. The third threshold may be, for example, 2 km, 3 km, or any other appropriate value, which is not limited in the present disclosure. Since the driving-in route usually starts after the vehicle travels a certain distance to approach a destination, the traveling distance of the vehicle may be calculated for the determination of the driving-in route. However, when learning to drive out of a garage, the frequented region 5 will be triggered once the vehicle is started. Thus, it is possible to only the location information of the vehicle after started to determine and operate.

In embodiments, the determination of the driving distance of the vehicle 1 may be based on a vehicle GPS device, a vehicle navigation route, or any other appropriate method, which is not limited in the present disclosure.

Taking the driving-in route 101-1 and a third threshold being 2 km as an example, when the vehicle 1 is started, the driving distance of the vehicle is first determined, and when the driving distance is greater than the third threshold of 2 km, it may be determined that the vehicle is outside the frequented region 5. In this way, when the vehicle 1 enters a boundary point 102-1 of the frequented region 5, the driving-in silent learning in the frequented region 5 is triggered. The silent learning and recording for the route may be performed by the computing device 130 directly, by the cloud 140, or by both.

After the vehicle 1 enters the parking space 121 and the engine of the vehicle is turned off, the silent learning may be terminated, that is, the learning and recording for the route is stopped, and the driving-in route of the vehicle 1 is acquired by the computing device 130 and/or the cloud 140 at block 430. Then, as described above, the driving-in route 101-1 may be determined as a historical parking route. Moreover, if the historical parking route passes the comparison or the check of validation, the historical parking route may be provided to the vehicle 1 as a candidate parking route for the automated parking of the vehicle.

Similarly, the driving-in routes 101-2 and 101-3 may be acquired at block 330 by using the parking space 121 (as an end point), and the intersections 102-2 and 102-3 between the driving-in routes and the frequented region 5. The driving-in routes 101-2 and 101-3 may be determined as candidate parking routes in a similar manner.

At optional block 420, a route for the vehicle 1 to travel a third predetermined distance before parking at the historical location may be determined. In the embodiment shown in FIG. 1, the historical location corresponds to the location of the parking space 121, as previously described. It will be understood that the historical location may be any other location used to determine the frequented region 5, which is not limited in the present disclosure.

Continuing to take the parking route 101-1 as an example, in such embodiment, the third predetermined distance may be set by the computing device 130 or the system thereof, or may be set by the user. The third predetermined distance may be any appropriate distance, such as 450 m, 500 m, or 1000 m. That is to say, in this way, the parking route 101-1 may be intercepted to have a length of the third predetermined distance (with a starting point at the parking space 121), so as to obtain a more accurate candidate parking route. Different from the way of determining the driving-out route, the driving-in route 101 is an intercepted route having a third predetermined distance, the route is intercepted beginning from the terminal after the terminal is determined, so that the driving-in route 101-1 with the length defined as the third predetermined distance may then be determined as the driving-in route at block 430.

It should be noted that the above method is only exemplary, and any other method may be used to acquire the driving-in routes 101-1, 101-2, and 103-3, which is not limited in the present disclosure.

Figure 5:
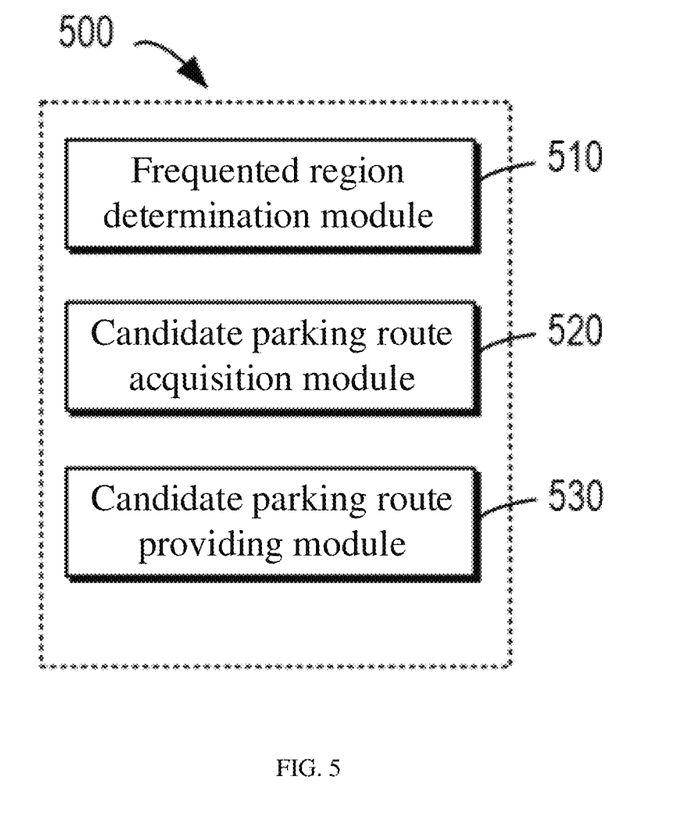
FIG. 5 shows a schematic block diagram of an apparatus for determining a state of an object according to an embodiment of the present disclosure.

FIG. 5 shows a schematic block diagram of an apparatus 500 for determining a state of an object according to an embodiment of the present disclosure. The apparatus 500 may be implemented as the computing device 130 and/or the cloud 140 shown in FIG. 1. As shown in FIG. 5, the apparatus 500 includes: a frequented region determination module 510, a candidate parking route acquisition module 520, and a candidate parking route providing module 530. The frequented region determination module 510 is used to determine, based on a historical location of a vehicle over a first time period, a frequented region associated with one or more candidate parking routes for the vehicle. The candidate parking route acquisition module 520 is used to acquire the one or more candidate parking routes for the vehicle based on one or more historical parking routes of the vehicle in the frequented region, where the one or more historical parking routes include a driving-in route and/or a driving-out route. The candidate parking route providing module 530 is used to provide the vehicle with the acquired one or more candidate parking routes in response to determining that the vehicle is in the frequented region, for the vehicle to drive in or drive out.

In embodiments, the frequented region determination module may include: a location point determination module used to determine a location point corresponding to the historical location of the vehicle; a predetermined region determination module used to determine a predetermined region based on the location point and a first predetermined distance; and a first determination module used to determine the predetermined region to be the frequented region, in response to a number of appearance of the vehicle in the predetermined region over the first time period being not less than a first threshold.

In embodiments, the frequented region determination module includes: a multi-location point determination module used to determine a plurality of location points corresponding to the historical location of the vehicle; a multi-predetermined region determination module used to determine a plurality of predetermined regions based on the plurality of location points and a first predetermined distance; and a second determination module used to determine, in response to determining that an overlap exist among at least two predetermined regions of the plurality of predetermined regions, the at least two predetermined regions to be the frequented region.

In embodiments, the candidate parking route acquisition module includes: a historical parking route acquisition module used to determine the one or more historical parking routes in response to a number of appearance of the vehicle within the frequented region being not less than a second threshold; and a candidate parking route acquisition first sub-module used to acquire the one or more candidate parking routes for the vehicle based on the one or more historical parking routes. In embodiments, the candidate parking route acquisition module includes: a location determination module used to determine whether the vehicle is within the frequented region; and a driving-out route acquisition module used to acquire the driving-out route of the vehicle in response to determining that the vehicle is within the frequented region.

In embodiments, the candidate parking route acquisition module includes: a driving distance determination module used to determine whether a driving distance of the vehicle is greater than a third threshold; and a driving-in route acquisition module used to acquire, in response to determining that the driving distance of the vehicle is greater than the third threshold and the vehicle being within the frequented region, the driving-in route of the vehicle.

In the technical solution of the present disclosure, the collection, storage, use, processing, transmission, provision, disclosure, and application of the user's personal information involved are all in compliance with relevant laws and regulations, take essential confidentiality measures, and do not violate public order and good customs.

In the technical solution of the present disclosure, authorization or consent is obtained from the user before the user's personal information is obtained or collected.

Figure 6:
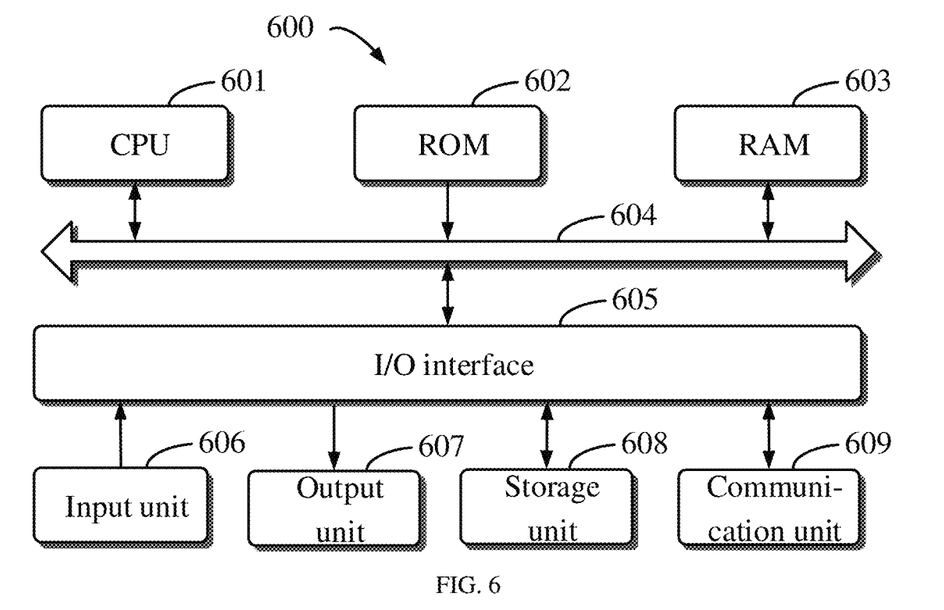
FIG. 6 shows a block diagram of a computing device applicable to implementation of a plurality of embodiments of the present disclosure.

FIG. 6 shows a block diagram of an electronic device 600 applicable to implementation of a plurality of embodiments of the present disclosure. The device 600 may be used to implement the computing device 130 or the cloud 140 shown in FIG. 1. As shown in FIG. 6, the electronic device 600 may include a computing unit 601, which may perform various appropriate actions and processing based on a computer program stored in a read-only memory (ROM) 602 or a computer program loaded from a storage unit 608 into a random-access memory (RAM) 603. Various programs and data required for the operation of the electronic device 600 may be stored in the RAM 603. The computing unit 601, the ROM 602, and the RAM 603 are connected to each other through a bus 604. An input/output (I/O) interface 605 is also connected to the bus 604.

Various components in the electronic device 600, including an input unit 606 such as a keyboard, a mouse, etc., an output unit 607 such as various types of displays, speakers, etc., a storage unit 608 such as a magnetic disk, an optical disk, etc., and a communication unit 609 such as a network card, a modem, a wireless communication transceiver, etc., are connected to the I/O interface 605. The communication unit 609 allows the electronic device 600 to exchange information/data with other devices through a computer network such as the Internet and/or various telecommunication networks.

The computing unit 601 may perform the various methods and processes described above, such as one or more of the process 200 to the process 400. For example, in embodiments, one or more of the process 200 to the process 400 may be implemented as a computer software program that is tangibly contained on a machine-readable medium, such as a storage unit 608. In embodiments, part or all of a computer program may be loaded and/or installed on the electronic device 600 via the ROM 602 and/or the communication unit 609. When a computer program is loaded into the RAM 603 and executed by the CPU 601, one or more steps in one or more of the process 200 to the process 400 described above may be executed. Alternatively, in other embodiments, the CPU 601 may be configured to perform any of the process 200 to the process 400 in any other appropriate way (for example, by means of firmware).

The functions described herein above may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server. The server may be a cloud server, a server for distributed system, or a server combined with a blockchain.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

Furthermore, although operations are depicted in a particular order, this should be understood to require that such operations be performed in the particular order shown or in a sequential order, or that all illustrated operations should be performed to achieve desired results. Under certain circumstances, multitasking and parallel processing may be advantageous. Likewise, although the above discussion contains several implementation-specific details, these should not be construed as limitations on the scope of the present disclosure. Certain features that are described in the context of separate embodiments may also be implemented in combination in a single implementation. Conversely, various features that are described in the context of a single implementation may also be implemented in multiple implementations separately or in any suitable sub-combination.

Although the subject matter has been described in language specific to structural features and/or logical acts of method, it should be understood that the subject matter defined in the appended claims is not necessarily limited to the specific features or acts described above. Rather, the specific features and acts described above are merely example forms of implementing the claims.

What is claimed is:

1. A method for automated parking, the method comprising:
    determining, based on a historical location of a vehicle over a first time period, a frequented region associated with one or more candidate parking routes for the vehicle, the determining the frequented region comprising:
        determining a plurality of location points corresponding to the historical location of the vehicle,
        determining a plurality of predetermined regions based on the plurality of location points and a first predetermined distance, and
        determining, in response to determining that an overlap exists among at least two predetermined regions of the plurality of predetermined regions, the at least two predetermined regions to be the frequented region;
    acquiring the one or more candidate parking routes for the vehicle based on one or more historical parking routes of the vehicle in the frequented region, wherein the one or more historical parking routes comprise a driving-in route and/or a driving-out route; and
    providing the vehicle with the acquired one or more candidate parking routes in response to determining that the vehicle is in the frequented region, for the vehicle to drive in or drive out.

2. The method of claim 1, wherein determining the frequented region comprises:
    determining a location point corresponding to the historical location of the vehicle;
    determining a predetermined region based on the location point and a first predetermined distance; and
    determining the predetermined region to be the frequented region, in response to a number of appearances of the vehicle in the predetermined region over the first time period being not less than a first threshold.

3. The method of claim 1, wherein acquiring the one or more candidate parking routes for the vehicle comprises:
    determining the one or more historical parking routes in response to a number of appearances of the vehicle within the frequented region being not less than a second threshold; and
    acquiring the one or more candidate parking routes for the vehicle based on the one or more historical parking routes.

4. The method of claim 1, wherein the acquiring the one or more candidate parking routes for the vehicle comprises:
    determining whether the vehicle is within the frequented region; and
    acquiring the driving-out route of the vehicle in response to determining that the vehicle is within the frequented region.

5. The method of claim 4, wherein acquiring the driving-out route of the vehicle comprises:
    determining a route for the vehicle to travel a second predetermined distance from the historical location, in response to the vehicle being within the frequented region; and
    acquiring the driving-out route of the vehicle based on the determined route for the vehicle to travel the second predetermined distance from the historical location.

6. The method of claim 1, wherein the acquiring the one or more candidate parking routes for the vehicle comprises:
    determining whether a driving distance of the vehicle is greater than a third threshold; and
    acquiring, in response to determining that the driving distance of the vehicle is greater than the third threshold and the vehicle being within the frequented region, the driving-in route of the vehicle.

7. The method of claim 6, wherein acquiring the driving-in route of the vehicle comprises:
    determining a route for the vehicle to travel a third predetermined distance before parking at the historical location, in response to the vehicle being within the frequented region; and
    acquiring the driving-in route based on the determined route for the vehicle to travel the third predetermined distance before parking at the historical location.

8. The method of claim 1, further comprising:
    determining environmental information of the frequented region;
    comparing the environmental information of the frequented region with environmental information corresponding to the one or more historical parking routes, in response to the vehicle being within the frequented region; and
    determining the one or more historical parking routes within the frequented region based on a result of the comparison.

9. The method of claim 8, further comprising, when the result of the comparison is lower than a predetermined matching degree, acquiring, in response to the vehicle being on a historical parking route of the one or more historical parking routes again, the historical parking route of the one or more historical parking routes again.

10. The method of claim 8, wherein the environmental information comprises simultaneous localization and mapping information.

11. The method of claim 1, further comprising determining, in response to the acquired historical parking routes of the vehicle comprising two or more driving-in routes, two or more driving-in routes that are at least partially identical, or identical parts of two or more driving-in routes as a single driving-in route.

12. The method of claim 1, further comprising determining, in response to the acquired historical parking routes of the vehicle comprising two or more driving-out routes, two or more driving-out routes that are at least partially identical, or identical parts of two or more driving-out routes as a single driving-out route.

13. The method of claim 1, further comprising invalidating the one or more candidate parking routes in response to a number of times where the provided one or more candidate parking routes are not selected exceeding a fourth threshold.

14. An electronic device, comprising:
one or more processors; and
a memory communicatively configured to store one or more programs which, when executed by the one or more processors, are configured to cause the one or more processors to at least:
    determine, based on a historical location of a vehicle over a first time period, a frequented region associated with one or more candidate parking routes for the vehicle;
    acquire the one or more candidate parking routes for the vehicle based on one or more historical parking routes of the vehicle in the frequented region, wherein the one or more historical parking routes comprise a driving-in route and/or driving-out route; and
    provide the vehicle with the acquired one or more candidate parking routes in response to determination that the vehicle is in the frequented region, for the vehicle to drive in or drive out,
    wherein the one or more programs are further configured to cause the one or more processors to:
    determine a plurality of location points corresponding to the historical location of the vehicle;
    determine a plurality of predetermined regions based on the plurality of location points and a first predetermined distance; and
    determine, in response to determination that an overlap exists among at least two predetermined regions of the plurality of predetermined regions, the at least two predetermined regions to be the frequented region.

15. The electronic device of claim 14, wherein the one or more programs are further configured to cause the one or more processors to:
    determine a location point corresponding to the historical location of the vehicle;
    determine a predetermined region based on the location point and a first predetermined distance; and
    determine the predetermined region to be the frequented region, in response to a number of appearances of the vehicle in the predetermined region over the first time period being not less than a first threshold.

16. The electronic device of claim 14, wherein the one or more programs are further configured to cause the one or more processors to:
    determine the one or more historical parking routes in response to a number of appearances of the vehicle within the frequented region being not less than a second threshold; and
    acquire the one or more candidate parking routes for the vehicle based on the one or more historical parking routes.

17. The electronic device of claim 14, wherein the one or more programs are further configured to cause the one or more processors to:
    determine whether the vehicle is within the frequented region; and
    acquire the driving-out route of the vehicle in response to determination that the vehicle is within the frequented region.

18. A non-transitory computer-readable storage medium having a computer program stored therein, the program, when executed by a computer system, configured to cause the computer system to at least:
    determine, based on a historical location of a vehicle over a first time period, a frequented region associated with one or more candidate parking routes for the vehicle, wherein the determination of the frequented regions comprises:
        determination of a plurality of location points corresponding to the historical location of the vehicle,
        determination of a plurality of predetermined regions based on the plurality of location points and a first predetermined distance, and
        determination, in response to determination that an overlap exists among at least two predetermined regions of the plurality of predetermined regions, the at least two predetermined regions to be the frequented region;
    acquire the one or more candidate parking routes for the vehicle based on one or more historical parking routes of the vehicle in the frequented region, wherein the one or more historical parking routes comprise a driving-in route and/or a driving-out route; and
    provide the vehicle with the acquired one or more candidate parking routes in response to determining that the vehicle is in the frequented region, for the vehicle to drive in or drive out.

19. The computer-readable storage medium according to claim 18, wherein the program is further configured to cause the computer system to:
    determine the one or more historical parking routes in response to a number of appearances of the vehicle within the frequented region being not less than a second threshold; and
    acquire the one or more candidate parking routes for the vehicle based on the one or more historical parking routes.

20. The computer-readable storage medium according to claim 18, wherein the program is further configured to cause the computer system to:
    determine whether a driving distance of the vehicle is greater than a third threshold; and
    acquire, in response to determining that the driving distance of the vehicle is greater than the third threshold and the vehicle being within the frequented region, the driving-in route of the vehicle.

* * * * *